(12) United States Patent
Hong et al.

(10) Patent No.: US 9,723,094 B2
(45) Date of Patent: Aug. 1, 2017

(54) METHOD OF TRANSMITTING CONTENTS AND USER'S INTERACTIONS AMONG MULTIPLE DEVICES

(71) Applicant: Samsung Electronics Co., Ltd., Suwon-si, Gyeonggi-do (KR)

(72) Inventors: Jung-kih Hong, Seoul (KR); Liexin Chen, Nanjing (CN); Min-suk Choi, Suwon-si (KR); Yoon-suk Choi, Anyang-si (KR); Zhi Wang, Nanjing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 248 days.

(21) Appl. No.: 14/400,158

(22) PCT Filed: May 8, 2013

(86) PCT No.: PCT/KR2013/004006
§ 371 (c)(1),
(2) Date: Nov. 10, 2014

(87) PCT Pub. No.: WO2013/168994
PCT Pub. Date: Nov. 14, 2013

(65) Prior Publication Data
US 2015/0100636 A1   Apr. 9, 2015

(30) Foreign Application Priority Data

May 10, 2012   (KR) .................. 10-2012-0049782

(51) Int. Cl.
*H04L 29/08* (2006.01)
(52) U.S. Cl.
CPC .............. *H04L 67/28* (2013.01); *H04L 67/02* (2013.01); *H04L 67/1051* (2013.01); *H04L 67/1053* (2013.01)

(58) Field of Classification Search
CPC .. H04L 67/28; H04L 67/1051; H04L 67/1053
(Continued)

(56) References Cited

U.S. PATENT DOCUMENTS 6,438,105 B1 * 8/2002 Qarni .................. H04L 1/18
358/425
7,424,285 B2   9/2008 Jei
(Continued)

FOREIGN PATENT DOCUMENTS

CN         1588862 A      3/2005
CN       101222346 A1    7/2008
(Continued)

OTHER PUBLICATIONS

Liang et al., "Hierarchically Clustered P2P Streaming System," Global Telecommunications Conference, 2007.*
(Continued)

*Primary Examiner* — Kevin Bates
*Assistant Examiner* — Chen-Liang Huang
(74) *Attorney, Agent, or Firm* — Jefferson IP Law, LLP

(57) ABSTRACT

A method for transmitting contents and user's interactions among multiple devices is provided. The method includes determining a group of object devices including a portion of the plurality of object devices, transmitting the data to the object devices of the determined group, receiving confirmation information from the object device which completes receiving of the data, among the object devices of the determined group, determining a clone device based on the received confirmation information. The transmitted clone information is used to transmit the data from the determined clone device to at least one object device which is not included in the object devices of the determined group among the plurality of object devices.

20 Claims, 14 Drawing Sheets

(58) Field of Classification Search
USPC ......................................................... 709/204
See application file for complete search history.

(56) References Cited

U.S. PATENT DOCUMENTS

| | | | |
|---|---|---|---|
| 7,738,390 B2 | 6/2010 | Rey et al. | |
| 8,018,933 B2 | 9/2011 | Dickens et al. | |
| 2003/0014705 A1* | 1/2003 | Suzuki | H04L 1/0045 714/748 |
| 2003/0235206 A1 | 12/2003 | Heller | |
| 2005/0148322 A1 | 7/2005 | Jei | |
| 2006/0034167 A1* | 2/2006 | Grice | G06F 15/17375 370/229 |
| 2009/0006641 A1 | 1/2009 | Yaqoob et al. | |
| 2010/0014520 A1* | 1/2010 | Matsumoto | H04L 12/1868 370/390 |
| 2010/0042668 A1 | 2/2010 | Liang et al. | |
| 2010/0202469 A1 | 8/2010 | Isaksson et al. | |
| 2010/0235507 A1 | 9/2010 | Szeto et al. | |
| 2011/0032941 A1 | 2/2011 | Quach et al. | |
| 2011/0134919 A1 | 6/2011 | Averbuch | |
| 2011/0213820 A1 | 9/2011 | Morris | |
| 2011/0213893 A1 | 9/2011 | Morris | |
| 2011/0219131 A1 | 9/2011 | Allen et al. | |
| 2011/0249564 A1 | 10/2011 | Cho | |
| 2011/0280243 A1 | 11/2011 | Boucher et al. | |
| 2011/0286379 A1 | 11/2011 | Dickens et al. | |
| 2011/0289312 A1 | 11/2011 | Tateishi et al. | |
| 2011/0314397 A1 | 12/2011 | Ogle et al. | |
| 2012/0026999 A1* | 2/2012 | Choi | H04L 12/1886 370/338 |
| 2015/0071184 A1* | 3/2015 | Dombrowski | H04L 1/08 370/329 |

FOREIGN PATENT DOCUMENTS

| | | |
|---|---|---|
| KR | 10-2004-0024628 A | 3/2004 |
| KR | 10-2005-0102679 A | 10/2005 |
| KR | 10-2008-0077235 A | 8/2008 |
| KR | 10-2009-0000052 A | 1/2009 |
| KR | 10-1002836 B1 | 12/2010 |

OTHER PUBLICATIONS

Liang et al., Hierarchically Clustered P2P Streaming System, Global Telecommunications Conference, 2007, pp. 236-241, vol. 1930-529X/07, IEEE, Piscataway, NJ, US.

* cited by examiner

METHOD OF TRANSMITTING CONTENTS AND USER'S INTERACTIONS AMONG MULTIPLE DEVICES

CROSS-REFERENCE TO RELATED APPLICATION(S)

This application is a U.S. National Stage application under 35 U.S.C. §371 of an International application filed on May 8, 2013 and assigned application number PCT/KR2013/004006, which claimed the benefit of a Korean patent application filed on May 10, 2012 in the Korean Intellectual Property Office and assigned Serial number 10-2012-0049782, the entire disclosure of each of which is hereby incorporated by reference.

TECHNICAL FIELD

The present disclosure relates to a technology for securing reliability of data and improving a transmission speed of the data when transmitting data between devices. more particularly, the present disclosure relates to a technology for setting a clone device operating as a host device to efficiently transmit data when transmitting a mass of data requiring a substantial load in a given network environment.

BACKGROUND

FIG. 1 illustrates a method of transmitting data from a host device to devices included in a system or on a network according to the related art.

Referring to FIG. 1, a network 100 includes a plurality of devices including a first device 110, a second device 120, a third device 130, a fourth device 140, a fifth device, a plurality of other devices 160 and a Nth device 190 exist on the network 100. The first device 110 is a host device having initial data, and the second and third devices 120 and 130 receive data. When N devices simultaneously receive data from a host device in such network environment, a load that the network may not cope with may occur. Such a case may result in connections between the host device and object devices becoming unstable or data being corrupted.

FIG. 2 is a drawing illustrating a Transmission Control Protocol (TCP) method used when transmitting data between devices according to the related art.

Referring to FIG. 2, The TCP method of the related art is to provide a reliable connection-oriented package transmission service based on TCP/IP standards. A TCP method basically has a connection process between an initiator (a host device 210) and a listener (an object device 220) on a network and thus ensures reliability of a data transmission. However, the TCP method requires a 3-way handshaking process between reception and transmission in a connection process. Such a 3-way handshake involves the host device 210 transmitting to the object device 220 a synchronization (SYN) for setting a segment's sequence number, in operation S230. In reply the object device 220 transmits to the host device 210 a synchronization acknowledgement (SYN-ACK) including the sequence number plus one in operation S240. The host device 210 transmits back an acknowledgement (ACK) to the object device 220 in operation S250. Due to this, a lot of packet exchanges occur in the connection process, causing delays to occur, therefore, the TCP method is inappropriate for simultaneously transmitting data to multiple devices.

Differently from the TCP, a User Diagram Protocol (UDP) does not go through a connection process between reception and transmission. The UDP has a faster transmission speed than the TCP but does not ensure reliability of transmitted data.

Accordingly, when data is transmitted to a plurality of devices on a network, there is needed a method of sharing and storing data, such as contents or interactions based on a user input, in real time without a loss of information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for transmitting contents and user's interactions among multiple devices.

In accordance with an aspect of the present disclosure, a method of transmitting data from a host device to a plurality of object devices is provided. The method includes determining a group of object devices including a portion of the plurality of object devices, transmitting the data to object devices of the determined group, receiving confirmation information from an object device which completes receiving of the data, among the object devices of the determined group, determining a clone device based on the received confirmation information, and transmitting clone information to the determined clone device. The transmitted clone information is used to transmit the data from the determined clone device to at least one object device which is not included in the object devices of the determined group among the plurality of object devices.

In accordance with another aspect of the present disclosure, a method of transmitting and receiving data from a device is provided. The method includes receiving the data from the a host device, transmitting, if the receiving of the data is completed, transmitting confirmation information to the host device, receiving clone information from the host device, and transmitting the data to at least one or more object devices based on the received clone information. The received clone information includes information about the at least one or more object devices which are to receive the data among a plurality of object devices included in a network.

In accordance with another aspect of the present disclosure, a host device for transmitting data to a group of object devices is provided. The host device includes a transceiver configured to transmit and receive information from a plurality of object devices, and a controller configured to determine the group of object devices including a portion of the plurality of object devices, to control the transceiver to transmit the data to the determined group of object devices, to control the transceiver to receive confirmation information from an object device which completes receiving of the data, among the determined group of object devices, to determine a clone device based on the received confirmation information, and to control the transceiver to transmit clone information to the determined clone device. The transmitted clone information is used to transmit the data from the determined clone device to at least one of the plurality of object devices which is not included in the determined group of object devices among the plurality of object devices.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the attached drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
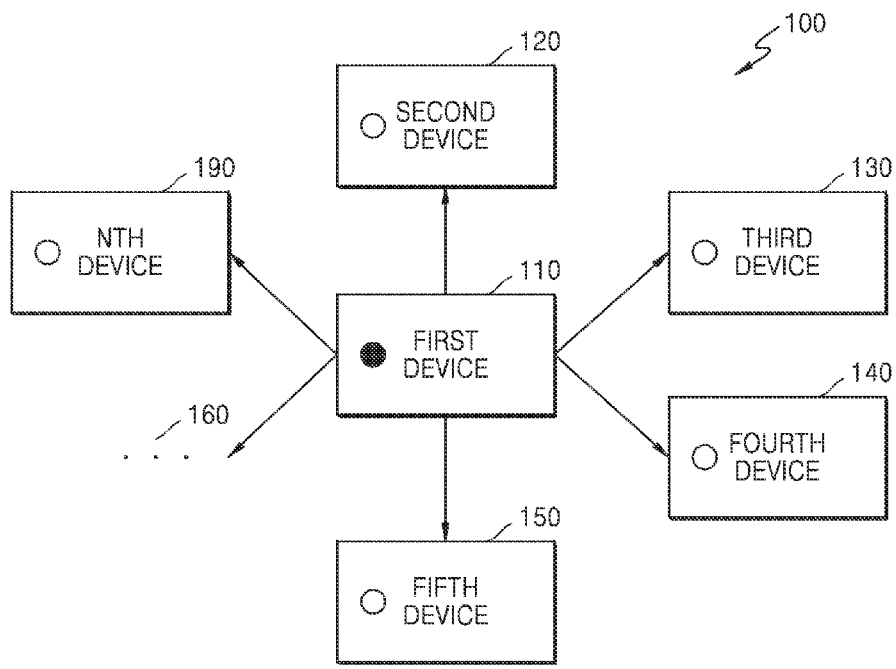
FIG. 1 is a drawing illustrating a method of transmitting data from a host device to devices included in a system or on a network according to the related art.
Figure 2:
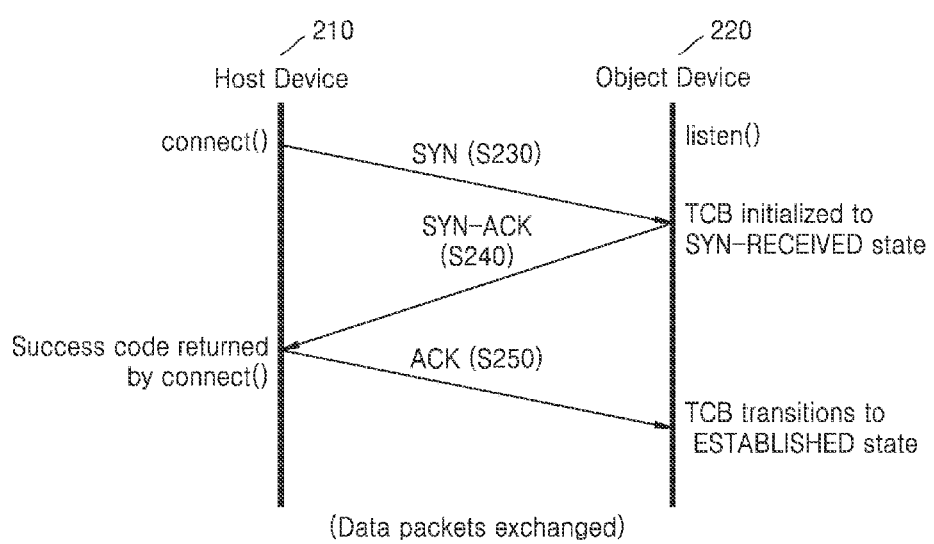
FIG. 2 is a drawing illustrating a Transmission Control Protocol (TCP) method used when transmitting data between devices according to the related art.
Figure 3:
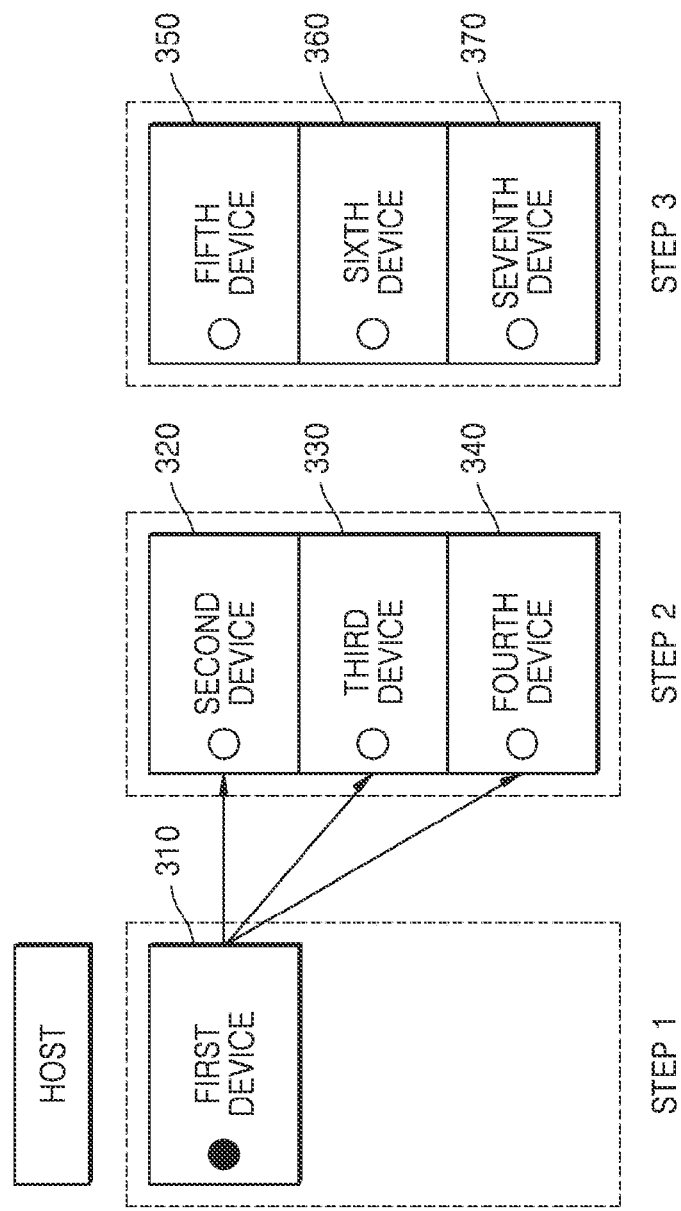
FIG. 3 is a drawing illustrating a data transmission method according to an embodiment of the present disclosure.

FIG. 3 is a drawing illustrating a data transmission method according to an embodiment of the present disclosure.

Referring to FIG. 3, a system or a network includes a host device (i.e., first device 310) and a plurality of object devices. An initial host device has data that is to be transmitted to the object devices constituting the system. For example, in a lecture environment based on a network, lecture material is stored in a device of a lecturer and is transmitted to devices participating in a lecture through the network at the beginning of a lecture. Alternatively, meeting material may be distributed to participants who participate in a meeting. However, the present disclosure is not limited to the above-described embodiment of the present disclosure but may consider various embodiments of the present disclosure.

The first device 310 determines a device to which an initial transmission is to start. A method of determining the device may be various. For example, data may be preferred to be first transmitted to a particular device according to a user of the device. A device to initially receive data may be randomly determined.

The number of devices which are to first receive data, i.e., a first number, may be determined in consideration of a network environment and/or capacity of the devices. For example, if the network bears a transmission amount of 100 Mbps, and a maximum bandwidth of 10 Mbps is set to transmit data between the network and each device, the first device 310 may set a maximum of 10 devices which are to first receive data. Alternatively, if a controller of a device is capable of simultaneously processing 100 loads, and 30 loads occur whenever one connection to each object device is kept, the number of devices which are to first receive data or the number of devices keeping a transmission thread with the first device 310 may be set to three or less.

In the present embodiment, the first device 310 starts to first transmit data to second, third, and fourth devices 320, 330, and 340, and the number of object devices keeping connections to the first device 310 is set to a maximum of 3. The second, third, and fourth devices 320, 330, and 340 which first receive the data are defined as devices of a first group. The second, third, and fourth devices 320, 330, and 340 of the first group may be set as clone devices which will be described later with reference to FIG. 4. It is also understood, any of devices, which are not included in the first group, for example, a device which receives the data from the first device 310 after the transmission of the data to the second device 320 is completed, may be set as a clone device. In addition, any of devices that have received data from the second device 320 may also be a clone device.

Figure 4:
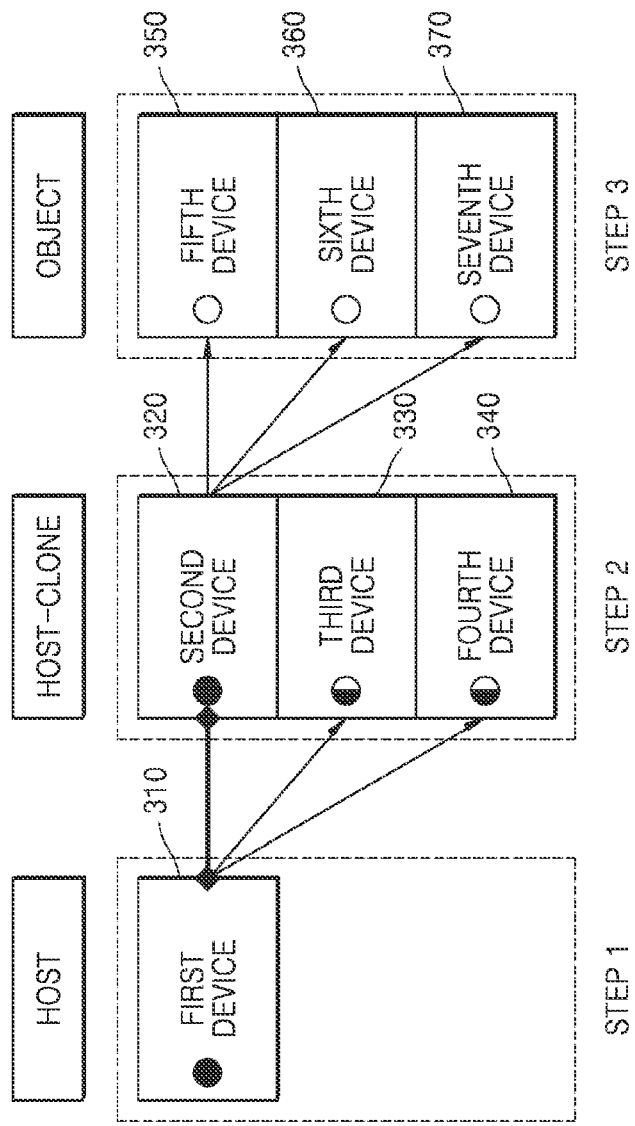
FIG. 4 is a drawing illustrating a method of setting a clone device according to an embodiment of the present disclosure.

FIG. 4 is a drawing illustrating a method of setting a clone device according to an embodiment of the present disclosure.

Referring to FIG. 4, the second device 320 has completely received all of data from the first device 310. When the second device 320 completely receives all of the data from the first device 310, the second device 320 transmits confirmation information indicating that the second device 320 has completely received the data from the first device 310. Any of the second device 320 and all object devices constituting the system, if they completely receive data from a first device or a clone device, may transmit confirmation information.

When the first device 310 receives the confirmation information, the first device 310 transmits clone information which is to set the second device 320 as a clone device. The first device 310 may set any device to a clone device and may set a device, which has first received data from the devices in the first group, as a clone device. The first device 310 may determine one of the devices of the system that needs to receive the data at a time when receiving the confirmation information. If the second device 320 has completely received the data, and the data is being transmitted from the first device 310 to the third and fourth devices 330 and 340, a fifth device 350 may be automatically decided as a device that need to receive data. However, the first device 310 may check and update a device list to which data is to be transmitted whenever receiving the confirmation information. As will be described later, the first device 310 may receive the confirmation information if transmission of the data to a particular device is completed, while the first device 310 may receive identification information if the transmission of the data to a particular device is still ongoing, thereby, the first device 310 may easily determine a device that has not started to receive the data. This operation may be performed by a controller of a device or an inter device interaction (INDI) platform.

When the first device 310 receives the confirmation information from the second device 320, the first device 310 transmits information about the second number of object devices which have not started to receive the data, to the second device 320. The second number of object devices are defined as devices of a second group. The devices of the second group are objects to which the second device 320, as a host-clone, is to transmit the data. Information related to the devices of the second group may be included in clone information and then transmitted.

The second number may be determined according to the same method as that by which the first number is determined. Therefore, the second number may have a different value from the first number according to capacity of a network or a device. To optimize a transmission time, the second device 320 may set the second number to the same number as the first number without an additional determination process. This may be particularly useful if devices constituting a network have similar capacities. Referring to FIG. 4, the number of remaining object devices which are to receive the data is shown as three (which is the same as the first number) or more, however, if the number of remaining object devices is lower than the first number, the number of remaining object devices may be set as a number lower than the first number.

When the second device 320 receives the clone information from the first device 310, the second device 320 may perform as a host device instead of the first device 310. In the embodiment of FIG. 4, a fifth device 350, a sixth device 360, and a seventh device 370 are included in the second group and receive the data from the second device 320 that is a clone device. The first device 310 additionally allocates bandwidth to the third and fourth devices 330 and 340 to increase a transmission speed. Also, the first device 310 allocates the bandwidth, which has been allocated to the second device 320, to remaining devices which have not received the data, to keep three connection states.

Figure 5:
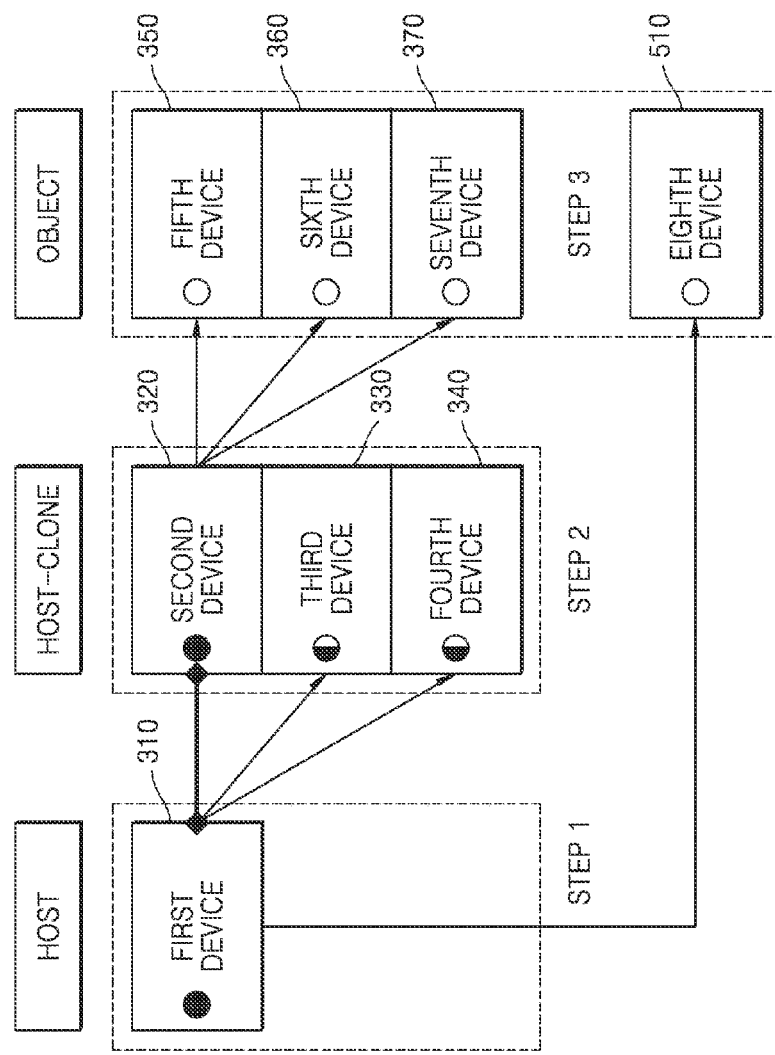
FIG. 5 is a drawing illustrating a method of transmitting data from an initial host device after a clone device is set according to an embodiment of the present disclosure.

FIG. 5 is a drawing illustrating a method of transmitting data from an initial host device after a clone device is set according to an embodiment of the present disclosure.

Referring to FIG. 5, when the first device 310 completes an operation for transmitting data to the second device 320, the first device 310 designates the second device 320 as a clone device and starts to transmit data to an eighth device 510. Thereby, the first device 310 may maintain initial data transmission efficiency.

Figure 6:
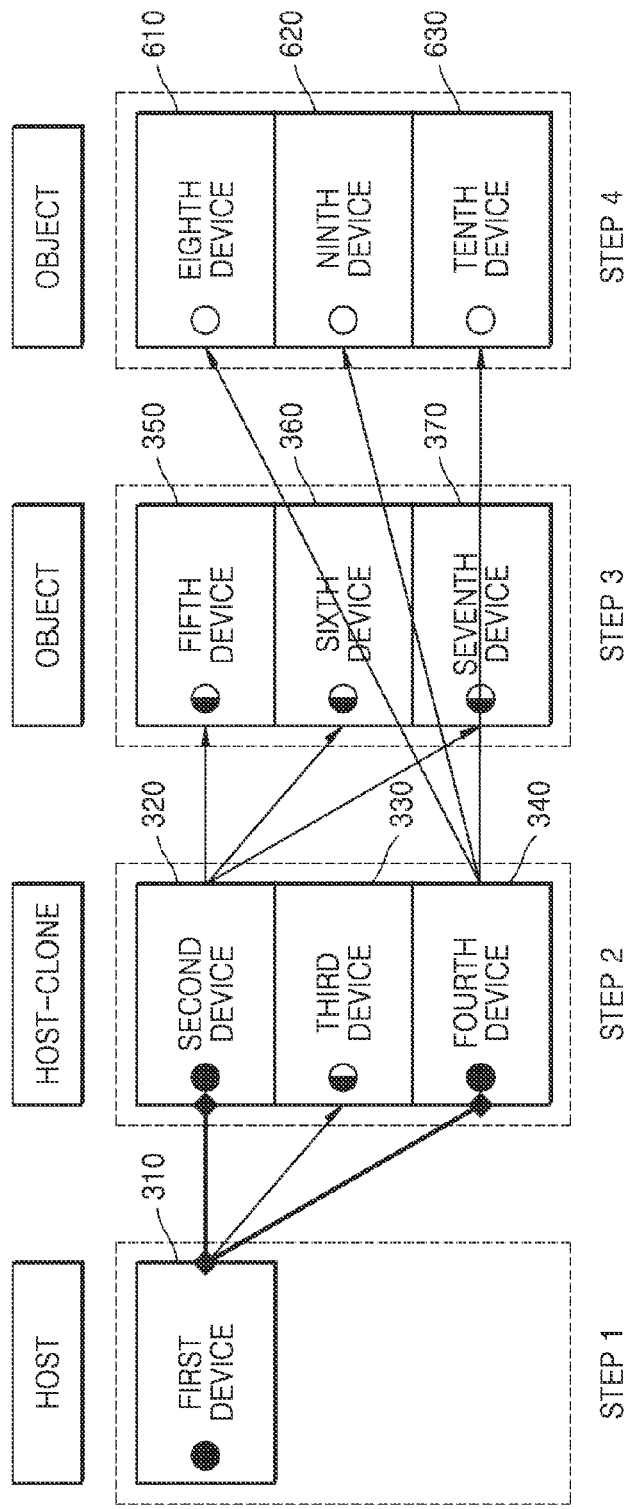
FIG. 6 is as drawing illustrating a method of determining a second clone device according to an embodiment of the present disclosure.

FIG. 6 is a drawing illustrating a method of determining a second clone device according to an embodiment of the present disclosure.

Referring to FIG. 6, after the second device 320, the fourth device 340 also completes receiving of data from the first device 310. The fourth device 340 transmits confirmation information indicating that the fourth device 340 completes receiving of the data from the first device 310, to the first device 310, and the first device 310 determines whether the system includes remaining object devices which are to receive the data. The eighth device 610, a ninth device 620, and a tenth device 630 have not yet received data. Therefore, the first device 310 sets the eighth device 610, the ninth device 620, and the tenth device 630 as a third group, put information related to devices of the third group into new clone information and transmit the information along with the new clone information to the fourth device 340.

Object devices which complete receiving of data from clone devices may transmit confirmation information indicating that receiving of data has been completed, to the clone devices or may directly transmit the confirmation information to an initial host device. A clone device may transmit confirmation information received from each object device, to a device which has transmitted clone information to the each clone device. Thereby, when confirmation information is received from all object devices of the network, the host device may determine that transmitting of data to the all object devices is completed to end a transmission process.

The methods described with reference to FIGS. 3 through 6 may be more efficient if the size of data that a host device is to transmit is relatively large. If the size of data to be transmitted is relatively small considering a capacity of a network or a host device, directly transmitting of data to all object devices in the system may be more efficient. In other words, the host device may first determine a size of data to be transmitted. Suppose a predetermined reference size to determine a transmission method is 10 Mbyte, a presentation file used for a lecture or a meeting, a moving picture file or the like may be transmitted to object devices setting a clone device as introduced above if they are greater than 10 Mbyte according to a determination result. Data smaller than a predetermined reference size, e.g., user interaction information for changing a page of material for a lecture, data generated through a user interaction such as capturing of a picture in a smart device by using an application, or a file to be shared with another object device through a user interaction may be directly transmitted from a host device to all object devices of the system.

Figure 7:
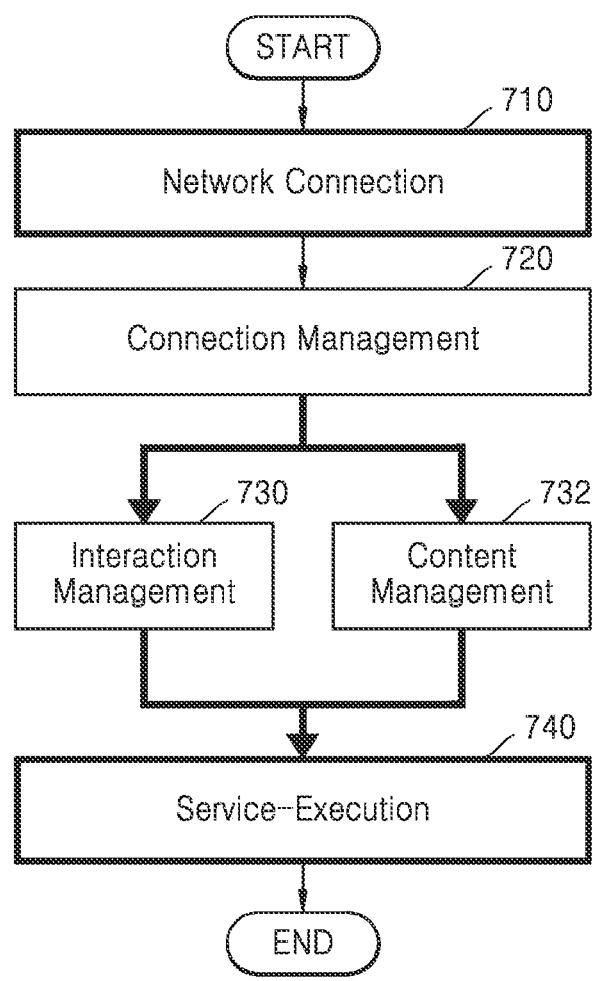
FIG. 7 is a flowchart illustrating a method of sharing contents and user's interactions through a network connection according to an embodiment of the present disclosure.

FIG. 7 is a flowchart illustrating a method of sharing contents and user's interactions through a network connection according to an embodiment of the present disclosure.

Referring to FIG. 7, in operation 710, a network connection to object devices is set. In operation 720, a host device starts managing the network connection. This operation may be performed by a connection management module 1010 of a controller of a host device 1000 of FIG. 10. The connection management module 1010 checks states of object devices on a network and informs the host device of state information.

An interaction management operation 730 and a content management operation 732 for sharing user's interactions and contents in real time will now be described. The interaction management operation 730 and the content management operation 732 may be performed by an interaction management module 1020 and a content management module 1030 of the controller of the host device 1000 of FIG. 10. The interaction management operation 730 is for simultaneously realizing a service with respect to one or more interaction objects of the system in real time. To share the service for real-time interactions with the multiple interaction devices on the network, interaction data and content data related to interactions are transmitted to target object device in a point-to-point manner. That is to say, data is transmitted according to a disrelation or a connectionless type transmission, i.e., a User Diagram Protocol (UDP) method, to remove a receipt notification waiting time. Therefore, user's interactions and related data may be shared at speed that may be realized by a UDP, without delays. Also, since the UDP method does not ensure reliability of data transmission, object devices according to an embodiment of the present disclosure receive interactions and data and transmit confirmation data to a transmission side thereby enhancing the reliability of data transmission.

The content management operation 732 and the interaction management operation 730 are basically equally performed. However, if content has a large size and is transmitted by using the above-described UDP method, a large amount of the content may be lost on the network. Therefore, the content management operation 732 may forms object handling threads to manage a transmission of the content. In this case, if a host device and object devices receiving data from the host device is of 1:N, a data transmission authority may be cloned from the host device to some of the object devices (i.e., clone devices) according to an order of receiving data so that the host device and the clone devices for transmitting data and the object device for receiving data is of M:N. For example, if M has a value lower than or equal to N/3, the host device or the clone device may form three or less transmission threads to transmit data to each object device. In detail, suppose M may be set to 15/3, i.e., 5, in a network environment including 15 devices. The host device may determine four clone devices to first transmit data, and then the clone devices that have completely received the data may transmit the data to each three object devices (wherein the last clone device is to transmit to one object device). Besides this method, as described with reference to FIGS. 3 through 6, the host device may first form the predetermined number of threads and starts transmission, and when the transmission of the data is completed by one thread, another thread may be generated at the host device to start transmitting of data to an object device that has not received the data.

When interactions and content data are transmitted to an object device through the connection management operation 720, the interaction management operation 730, and the content management operation 732, the corresponding object device may execute a service in operation 740. In other words, states of a paint, a content, a smart device, etc., may be shared. Also, a camera shot, a touch action, etc. generated through interactions or the like may be shared.

Figure 8:
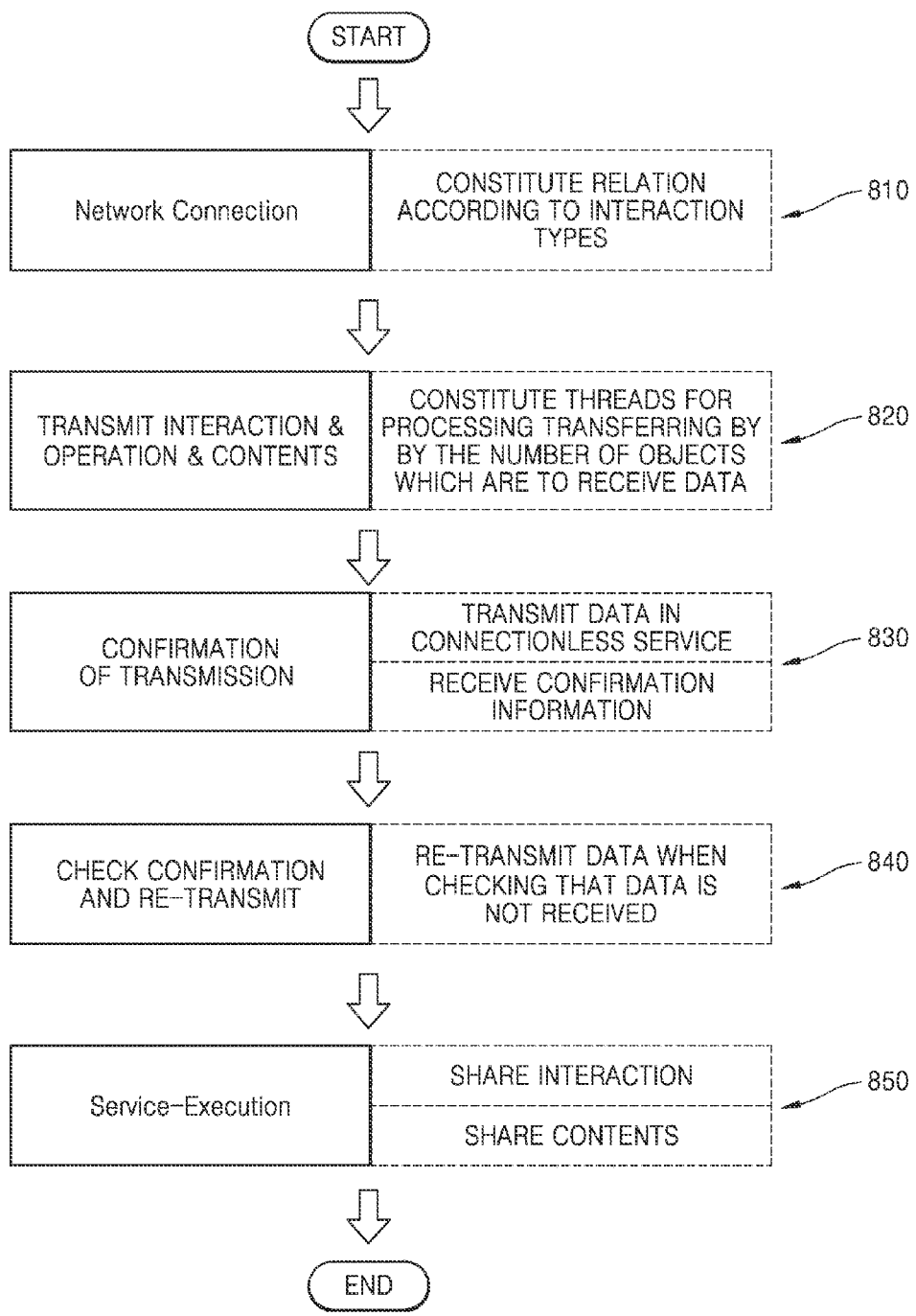
FIG. 8 is a flowchart illustrating a detailed method of sharing user's interactions and contents through a service execution according to an embodiment of the present disclosure.

FIG. 8 is a detailed flowchart illustrating a method of sharing interactions and contents through the above-described service execution according to an embodiment of the present disclosure.

Referring to FIG. 8, the contents overlapping the above descriptions will be omitted. In operation 810, a network connection is set according to types of interactions. In operation 820, threads for processing transmission are generated according to the number of object devices which are to receive data. In operation 830, the data is transmitted according to a disrelation method, and receipt confirmation information is received from an object device that has completely received the data. If the receipt confirmation information is not received from the object device in operation 830, the data is re-transmitted to the corresponding object device in operation 840. Operation 840 is to ensure reliability of data when transmitting the data according to a UDP method and may be applied in the unit of packets constituting the data. This will be described in detail later with reference to FIG. 11. If all of the data is completely received, a service is executed based on the received data to share interactions and contents in operation 850.

Figure 9:
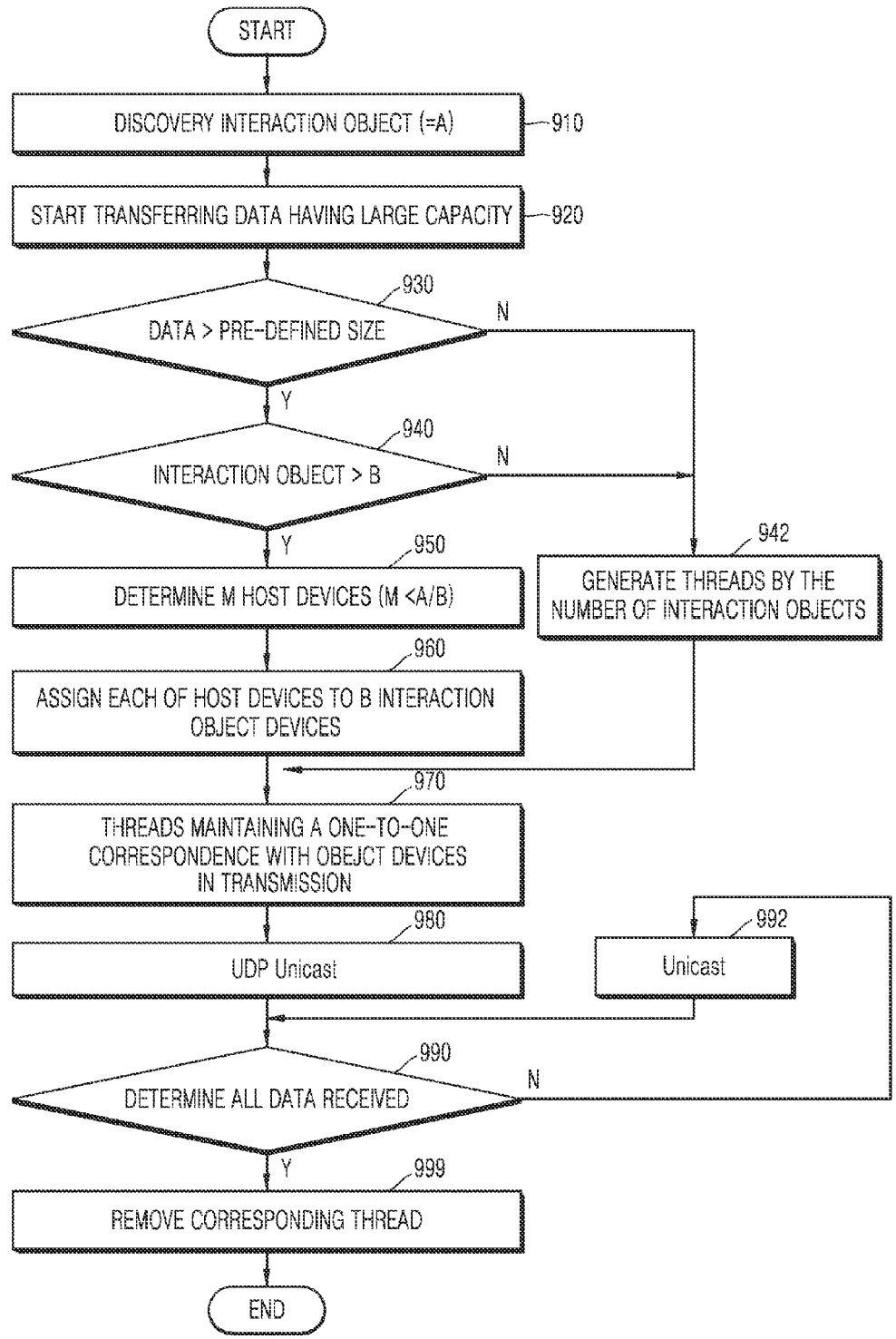
FIG. 9 is a flowchart illustrating a method of transmitting data according to an embodiment of the present disclosure.

FIG. 9 is a flowchart illustrating a method of transmitting data according to an embodiment of the present disclosure.

Referring to FIG. 9, the contents overlapping with the above descriptions will be omitted. In operation 910, an initial host device checks an object device existing on a network. The number of checked object devices may be A. In operation 920, a data transmission starts. In operation 930, a host device determines whether a size of the data is greater than or equal to a pre-defined size. If the size of the data is smaller than the pre-defined size, a host-clone method does not need to be applied, and thus the process goes to operation 942. If the size of the data is greater than the pre-defined size, and the number of object devices is smaller than a predetermined value B, the host-clone method does not need to be applied, and thus the process goes to operation 942. The predetermined value B corresponds to the first number described above with reference to FIG. 3. In operation 942, threads are generated by the number of object devices to go to operation 970.

If the size of the data is greater than or equal to the pre-defined size, and the number of object devices is greater than a predetermined value, the process goes to operation 950. In operation 950, the host device determines an object device which is to operate as a clone device. The number M of devices may be a natural number that is lower than or equal to a value obtained by dividing the number A of all object devices of the system by the predetermined value B. The method described above with reference to FIGS. 3 through 6 may also be applied to operation 950.

The object devices determined in operation 950 takes charge of transmission to the maximum number B of object devices in operation 960. As described above, the determined object device operates as a clone device after receiving of data from the initial host device is completed. In operation 970, the threads keep a one-to-one correspondence relation in all subsequent transmission and manage transmissions of the object devices. In operation 980, each data is transmitted according to a UDP method. In operation 990, determine if all of the data has been received is received. In operation 999, if confirmation information indicating that all of the data has been received, is received, remove the corresponding threads. If there is no confirmation of receiving, the process goes to operation 992. In operation 992, the host device or the clone device may transmit data according to a method different from the UDP method. This will be described in detail later with reference to FIG. 11.

Figure 10:
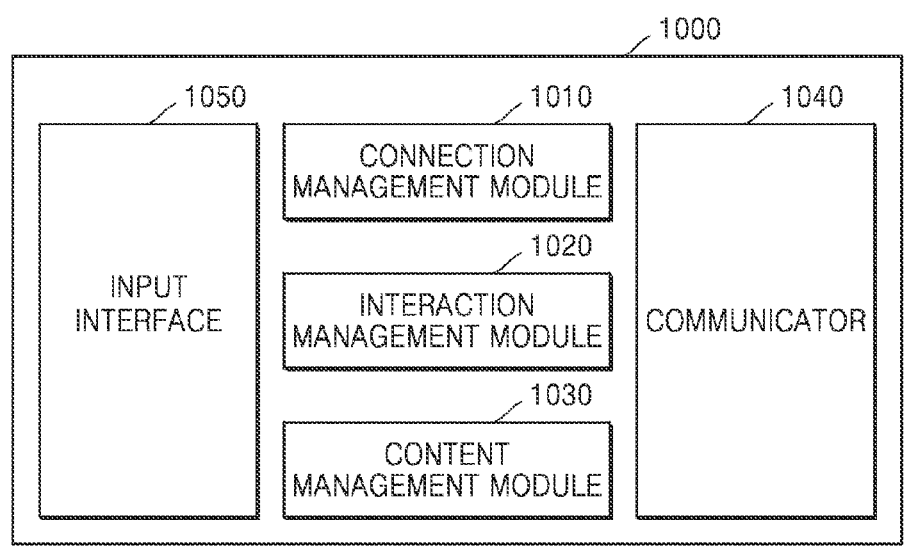
FIG. 10 is a block diagram illustrating a host device according to an embodiment of the present disclosure.

FIG. 10 is a block diagram illustrating the host device 1000 according to an embodiment of the present disclosure.

Referring to FIG. 10, the host device 1000 includes the connection management module 1010, the interaction management module 1020, the content management module 1030, a communicator 1040, and an input interface 1050. The connection management module 1010, the interaction management module 1020, and the content management module 1030 may be managed by the controller (not shown). The controller may further include a unit which is to realize a function that is required for operating devices and is obvious to ordinary ones skilled in the art. The communicator 1040 may additionally include a transmitter and a receiver. The input interface 1050 includes interfaces related to a physical input through a keypad and all types of inputs through a touch screen, a stylus, an S pen, a sensor, etc. The host device may include a storage device (not shown). If data is stored by using a service such as a cloud or the like, the storage device may not be required.

Overlapping with the descriptions related to the above-described modules will be omitted. Also, a description of a function performed by the corresponding unit will be omitted. The connection management module 1010 collects information of object devices included on the network. Alternatively, the connection management module 1010 determines an object device which needs to receive data or interactions. The connection management module 1010 determines a predetermined first group including object devices which are to first receive the data. The communicator 1040 transmits the data to the object devices of the first group and receives a confirmation message indicating that receiving of the data has been completed, from the object devices that has completed receiving of the data. The communicator 1040 transmits, to an object device which is to operate as a clone device, clone information including information about a second group, for which the object device is to take charge of transmission as a clone device.

The host device 1000 may be equally applied to a structure of an object device, in particular, to a structure of a clone device. In detail, the communicator 1040 of the object device receives data from a host/clone device. The content management module 1030 determines whether receiving of all types of contents has been completed. The interaction management module 1020 performs the same function as the content management module 1030. If all of the data is completely received, the communicator 1040 transmits confirmation information indicating that receiving of the data from the host/clone device has been completed. If an object device receives clone information from the host device, the communicator 1040 as a clone device transmits the data of the clone information to the object devices of the second group or a third group. The communicator 1040 of the clone device which has received the confirmation information indicating that receiving of the data from the object device has been completed, may forward the confirmation information to the host device.

Figure 11:
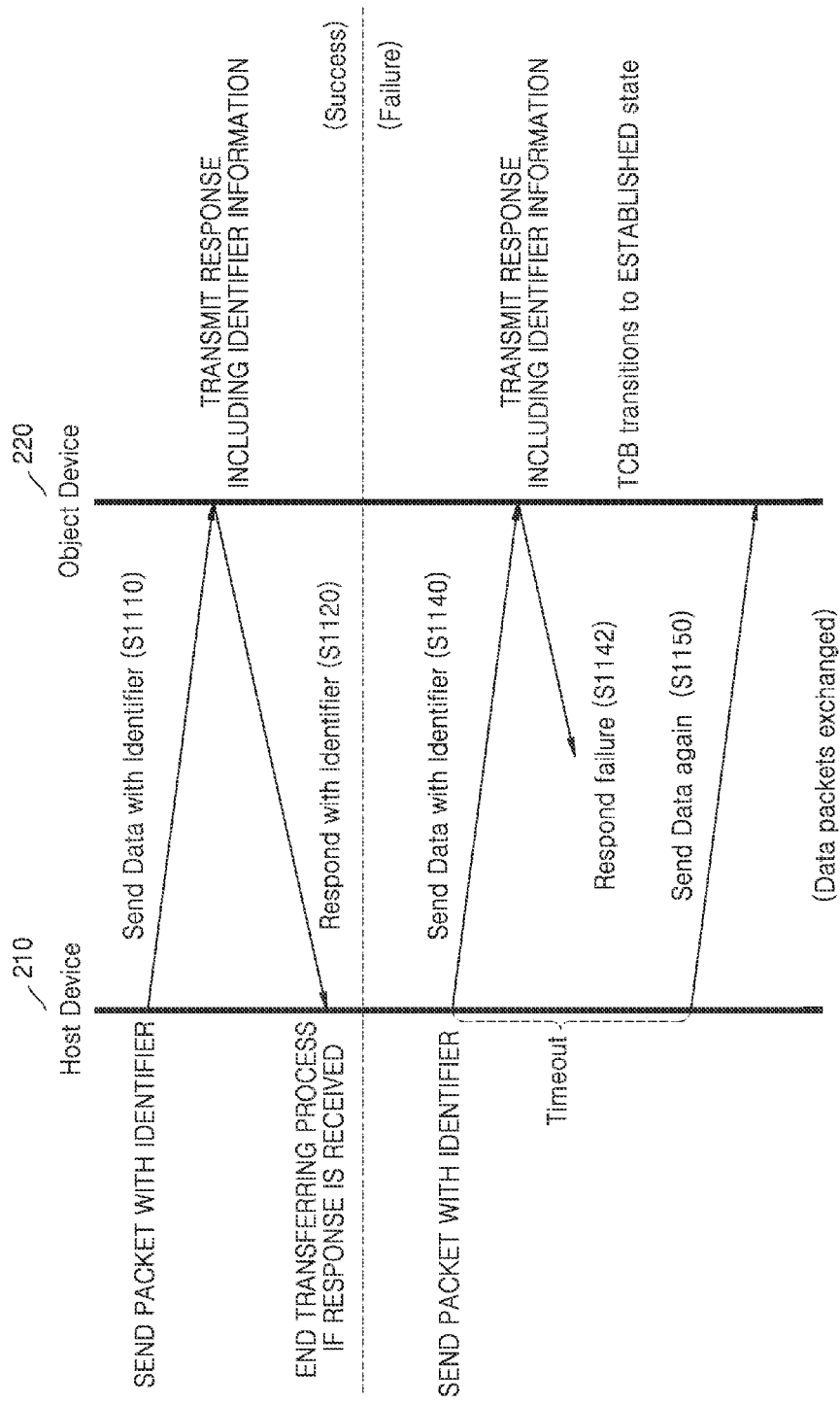
FIG. 11 is a detailed drawing illustrating a process of transmitting data according to an embodiment of the present disclosure.

FIG. 11 is a drawing illustrating a detailed process of transmitting data according to an embodiment of the present disclosure.

Referring to FIG. 11, the data includes a plurality of packets. In operation S1110, when a host device 210 transmits the data to the object device 220, the host device 210 sends the packets with an identifier to the object device 220. In operation S1120, the object device 220 transmits a response message with identifier information to the host device 210. When the host device 210 receives the response message, the host device 210 ends a process of transmitting the packages (succeeds in transmitting the packets).

A process of exchanging data packets that have failed to be transmitted will now be described. In operation S11140, the host device 210 transmits the packets with the identifier to the object device 220. The object device 220 transmits a response message with identifier information to the host device 210. If the object device 220 does normally receive the packets, or even when the object device 220 normally receives the packets, a response message thereto may not reach the host device 210 in operation S1150. In this case, the host device 210 waits for a response for a predetermined time from a time when the host device 210 transmits the packets. Also, if there is no response with respect to the receipt of the packets from the object device 220 until a predetermined time elapses, the host device 210 re-transmits the corresponding packets. The packets may be transmitted according to two types of methods. The host device 210 may repeatedly transmit the packets to the object device 220 until the host device 210 receives a response message from the object in the same method of first transmitting packets without an interconnection process. Also, the host device 210 may set a connection process between devices to transmit a corresponding packet at a time when the response message is not received. In such case, a transmission method of a Transmission Control Protocol (TCP) may be used.

The above-described method has the following effects. Reliability of data is not ensured in the UDP transmission method. In other words, a loss of data may occur under UDP transmission. However, in the above-described embodiment, when data is transmitted, an identifier is transmitted along with the data, and then a response thereto is received, thereby ensuring reliability of the data. Also, since a connection process between devices is not performed, a transmission speed is improved, and data of the devices is efficiently used.

In the TCP method, reliability of data is ensured, but a delay of a connection occurs due to 3-way handshaking. Also, if the data includes four packets of A, B, C, and D, and the packet A fails to be transmitted, the packets B, C, and D are transmitted regardless of the failure in the transmission of the packet A in the UDP method. However, in the TCP method, the packets B, C, and D are not transmitted until the packet A is completely transmitted. As a result, the transmission of the data is delayed. However, in the present disclosure, although the packet A is not transmitted, the packets B, C, and D are still transmitted, and the packet A is re-transmitted. Therefore, a transmission speed is more improved than in the TCP method.

Data is transmitted in the units of packets, but the above description may be applied when data is transmitted in the unit of one content or one interaction. For example, a receiving side transmits acknowledgements with respect to interactions received from a transmitting side, to the transmitting side. The transmitting side may re-transmit the interactions, acknowledgements of which are not received, to the receiving side according to a connection-oriented method (a TCP method).

FIGS. 12, 13, 14, and 15 are drawings illustrating detailed embodiments of the present disclosure.

Figure 12:
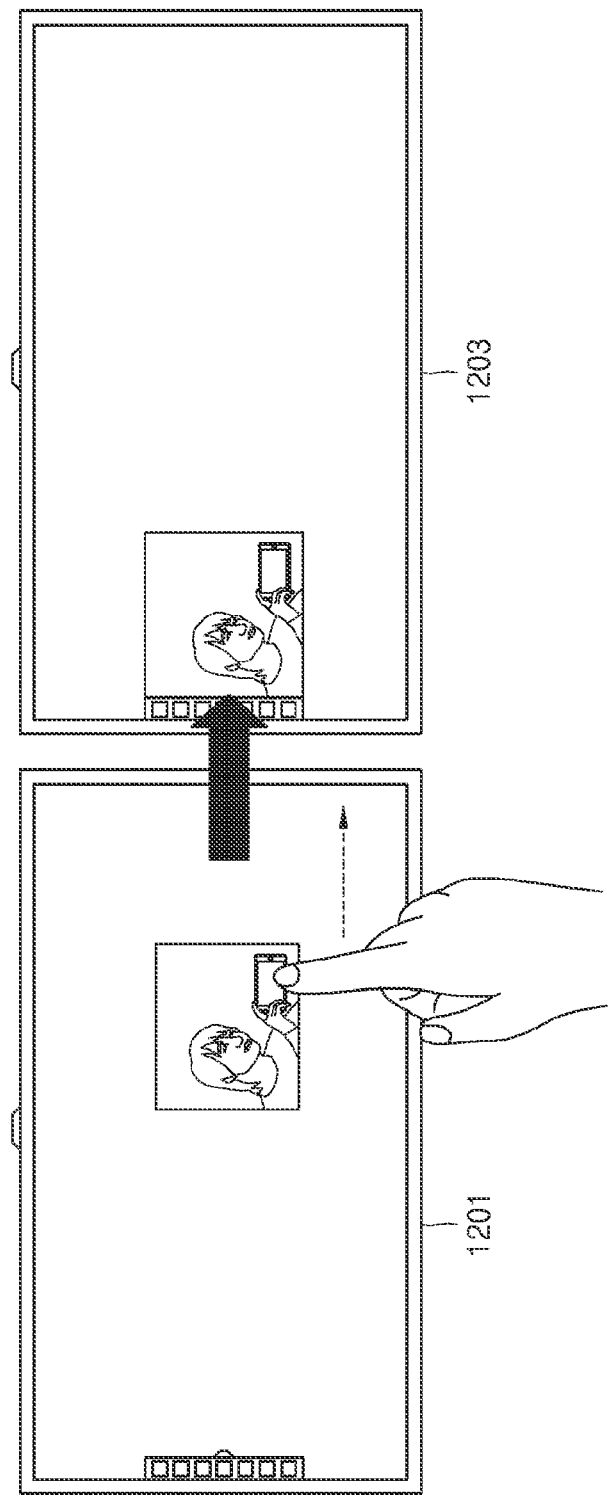
FIG. 12 is a drawing illustrating an electronic bulletin board according to an embodiment of the present disclosure.

FIG. 12 illustrates electronic bulletin boards according to an embodiment of the present disclosure.

Referring to FIG. 12, a plurality of electronic bulletin boards may be used as one connected electronic bulletin board. An image displayed on a screen of the left electronic bulletin board 1201 is moved onto the right electronic bulletin board 1203 by using a touch-and-drag method. The left electronic bulletin board 1201 transmits an interaction and an image related to the interaction to the right electronic bulletin board 1203. The right electronic bulletin board 1203 may execute a service which is to receive the interaction and the image from the left electronic bulletin board 1201 and continuously display the image on the left electronic bulletin board 1201.

Figure 13:
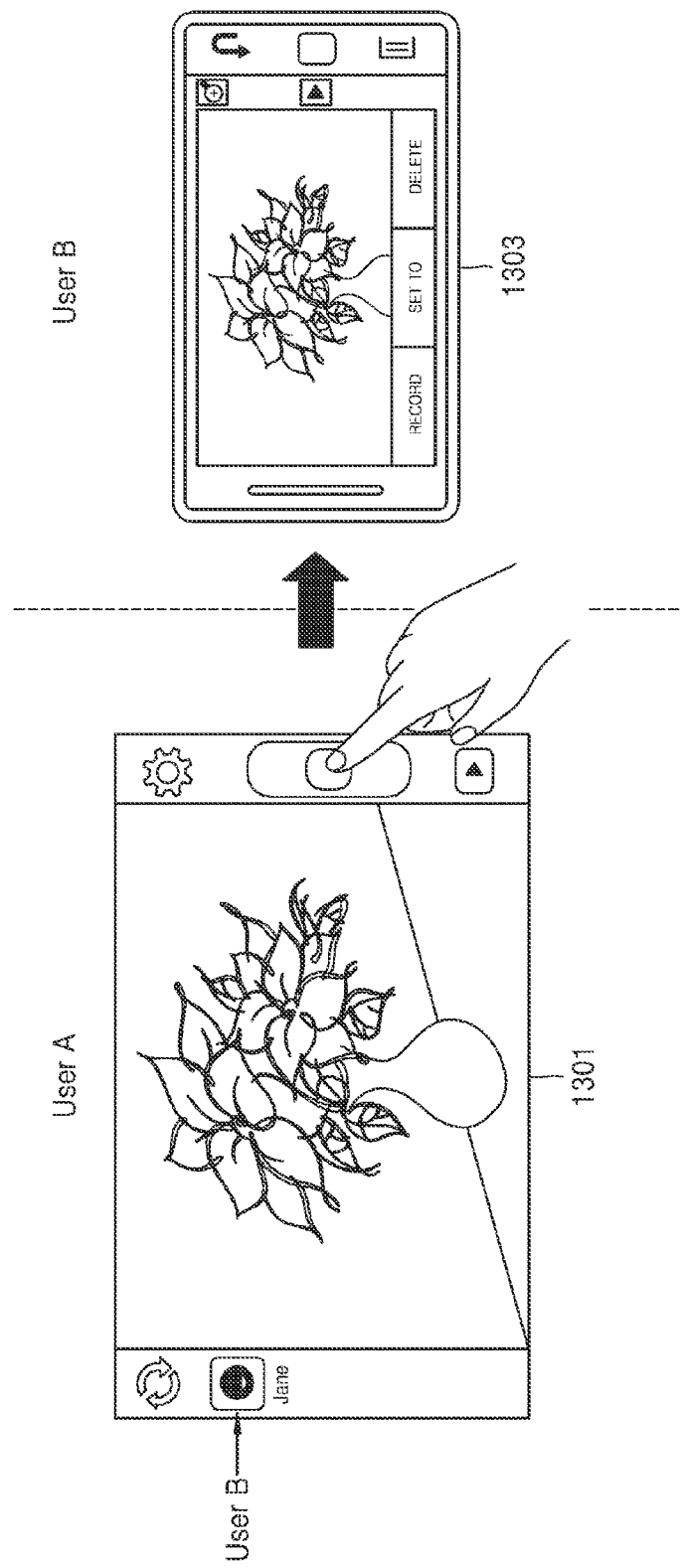
FIG. 13 is a drawing illustrating a method of sharing an image captured by a device in real time according to an embodiment of the present disclosure.

FIG. 13 illustrates a method of sharing an image captured by a device in real time according to an embodiment of the present disclosure.

Referring to FIG. 13, if two devices 1301 and 1303 exist on a network, user B shares a picture captured by user A. A displays of the device 1301 of the user A displays that the user B currently exists on the network. If the user A clicks a capturing button, the picture captured by the device of the user A may be immediately transmitted to a device 1303 of the user B without a waiting time. The device 1303 of the user B may check on/off states on the network to simultaneously receive and check an instantaneously captured image in real time without a waiting time.

Figure 14:
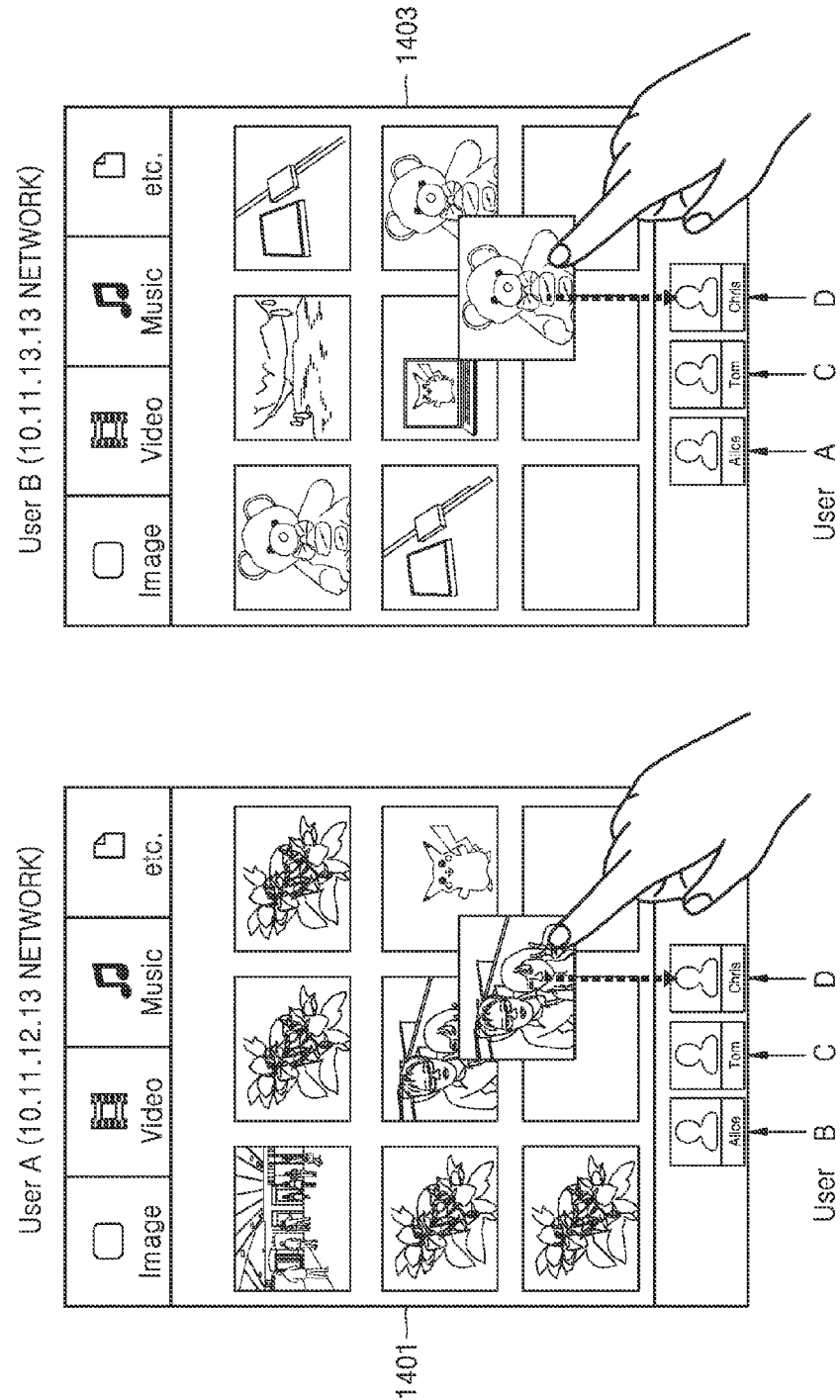
FIG. 14 is a drawing illustrating a method of simultaneously transmitting contents to devices of users of a particular group included on a network according to an embodiment of the present disclosure.

FIG. 14 illustrates a method of simultaneously transmitting a content to devices of users of a particular group included on a network according to an embodiment of the present disclosure.

Referring to FIG. 14, a display 1401 of user A displays image thumbnails and a list of users of a group. If the user A selects a particular image to input an interaction such as a drag-and-drop or the like into a user list area, the corresponding image may be simultaneously transmitted to devices 1403 of users B, C, and D. To simultaneously and independently execute this service, users may be detected and states of devices of the users may be checked in a background.

Figure 15:
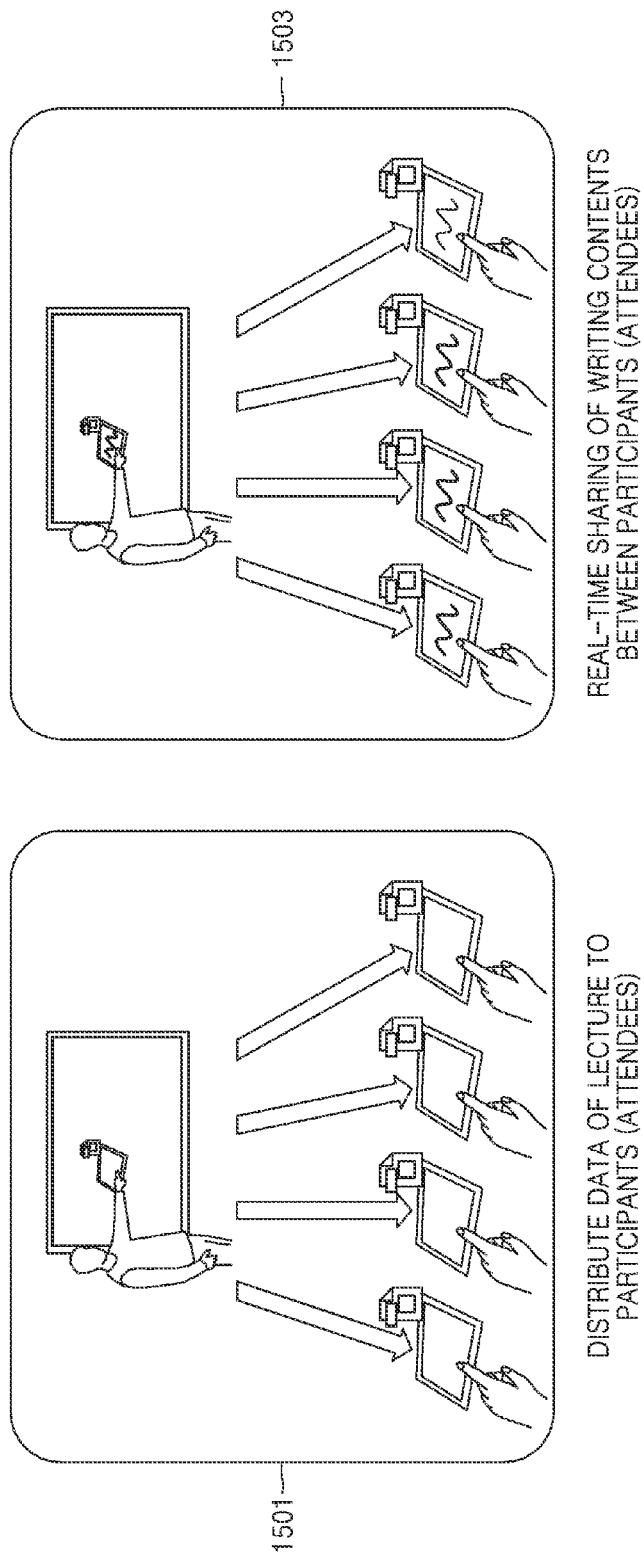
FIG. 15 is a drawing illustrating a method of sharing data and writing in a lecture, a meeting, or the like according to an embodiment of the present disclosure.

FIG. 15 is a drawing illustrating data and writing in a lecture or a meeting according to an embodiment of the present disclosure.

Referring to FIG. 15, data of a device of a presenter may be transmitted to devices of participants 1501. If the data has a large capacity, transmitting of the data according to a host-clone method may be efficient. Also, if the presenter inputs writing such as memos, notes, or the like onto an electronic bulletin board of a tablet PC, contents of the writing may be transmitted to the devices of the participants 1503 in real time. If a page of the data of the lecture displayed on the device of the presenter is changed, a page changing interaction may be transmitted to the devices of the participants in real time, and thus the package may be simultaneously changed, i.e., synchronized, on the devices of the participants.

As described above, according to the present disclosure, interactions occurring in devices of users participating in a network are shared with the users in real time without delays.

Also, if data having a large capacity is to be transmitted, a clone device is set to more efficiently transmit the data than when data is simultaneously transmitted to all devices by a single device.

In addition, the data is transmitted in a connectionless mode (UDP) service not in a connection-oriented mode of a TCP, while reliability of the simultaneously transmitted data is ensured.

The present disclosure is described hereinafter with reference to flowchart illustrations of user interfaces, methods, and computer program products according to various embodiments of the present disclosure. It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. The various embodiments of the present disclosure may be written as computer programs and may be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs).

Functions of various types of elements illustrated in the drawings may be provided by using hardware for executing software in relation to appropriate software and exclusive hardware. When the functions are provided through a processor, the functions may be provided through a single exclusive processor, a single sharing processor, or a plurality of processors, some of which may be shared. Also, an explicit using of the term "processor" or "controller" is not interpreted as exclusively referring to hardware for executing software and may impliedly include digital signal processor (DSP) hardware, a readable ROM for storing software, a RAM, a non-volatile storage device.

In claims of the present specification, an element expressed as a means for performing a particular function may include an arbitrary method of performing the particular function. This element may include combinations of circuit elements performing the particular function or software that has an arbitrary format and includes firmware, a microcode, or the like combined with a circuit appropriate to perform software for performing the particular function.

In the present specification, designations of an "embodiment" of principles of the present disclosure and various modifications of this expression may mean that a particular characteristic, structure, feature, etc. are included in at least one embodiment of the principles of the present disclosure in relation to the "embodiment". Therefore, the expression "embodiment" and arbitrary other modifications disclosed throughout the present specification may not refer to the same embodiment.

In the present specification, in the case of at least one of "A and B", an expression "at least one of" is used to include only a selection of first option (A), only selection of a second listed option (B), or a selection of the options (A) and (B). As an additional example, in the case of "at least one of A, B, and C", an expression "at least one of" may include only a selection of first listed option (A), only a selection of second listed option (B), only a selection of third listed option (C), only a selection of the first and second listed options (A) and (B), only a selection of the second and third listed options (B) and (C), or a selection of three options (A), (B), and (C). More items that are listed may be clearly extensibly interpreted by those of ordinary skill in the art.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of transmitting data from a host device to a plurality of object devices, the method comprising:
    determining a group of object devices comprising a portion of the plurality of object devices;
    transmitting the data to the object devices of the determined group;
    receiving confirmation information from an object device which completes receiving of the data, among the object devices of the determined group;
    determining a clone device based on the received confirmation information; and
    transmitting clone information to the determined clone device,
    wherein the transmitted clone information is used to transmit the data from the determined clone device to at least one of the plurality of object devices which is not included in the object devices of the determined group among the plurality of object devices.

2. The method of claim 1, further comprising:
    transmitting, if the host device receives the confirmation information, the data to at least one of other object devices, which are not included in the object devices of the determined group, among the plurality of object devices.

3. The method of claim 1,
    wherein the determining of the clone device comprises determining a plurality of clone devices, and
    wherein other object devices not included in the object devices of the determined group among the plurality of the object devices, to which the data is transmitted, are divided according to the plurality of clone devices.

4. The method of claim 1, wherein, if a size of the data is smaller than a predetermined size, the data is simultaneously transmitted to the plurality of object devices.

5. The method of claim 1,
    wherein the data comprises a plurality of packets, and
    wherein the transmitting of the data comprises:
        transmitting a packet among the plurality of packets with an identifier to another object device among the object devices of the determined group according to a user diagram protocol (UDP) method;
        receiving a response comprising the identifier from the other object device among the object devices of the determined group; and
        ending, if the response is received, a transmission process of the packet.

6. The method of claim 5, further comprising:
    re-transmitting, if the response is not received until a predetermined time elapses from a time when the packet with the identifier is transmitted to the object device among the object devices of the determined group according to the UDP method, the packet according to a transmission control protocol (TCP) method.

7. A method of transmitting and receiving data from a device, the method comprising:
    receiving the data from a host device;
    transmitting, if the receiving of the data is completed, confirmation information to the host device;
    receiving clone information from the host device; and
    transmitting the data to at least one object device based on the received clone information,
    wherein the received clone information comprises information about the at least one object device which are to receive the data among a plurality of object devices included in a network.

8. The method of claim 7, further comprising:
    transmitting, if confirmation information indicating that the receiving of the data is completed is received from the at least one object device, the confirmation information received from the at least one object device to the host device.

9. The method of claim 7, wherein the transmitted confirmation information is used to determine a clone device to which the received clone information is transmitted from the host device.

10. The method of claim 7, wherein the data is provided to a portion of the plurality of object devices included in the network.

11. The method of claim 7,
    wherein the data comprises a plurality of packets, and
    wherein the transmitting of the data comprises:
        transmitting a packet among the plurality of packets with an identifier to an object device among the at least one object device according to a user diagram protocol (UDP) method;
        receiving a response comprising the identifier from the object device among the at least one object device; and
        ending, if the response is received, a transmission process of the packet.

12. The method of claim 11, further comprising:
    re-transmitting, if the response is not received until a predetermined time elapses from a time when the packet with the identifier is transmitted to the object device among the at least one object device according to the UDP method, the packets according to a transmission control protocol (TCP) method.

13. A non-transitory computer-readable recording medium having recorded thereon a program executed by at least one processor to perform the method of claim 1.

14. A non-transitory computer-readable recording medium having recorded thereon a program executed by at least one processor to perform the method of claim 7.

15. The method of claim 5, wherein the transmitting of the packet among the plurality of packets with the identifier occurs prior to receiving the response of a previously transmitted packet with a sequentially lower identifier than the identifier.

16. The method of claim 11, wherein the transmitting of the packet among the plurality of packets with the identifier occurs prior to receiving the response of a previously transmitted packet with a sequentially lower identifier than the identifier.

17. A host device for transmitting data to a group of object devices, the device comprising:
    a transceiver configured to transmit and receive information from a plurality of object devices; and
    at least one processor configured to:
        determine the group of object devices comprising a portion of the plurality of object devices,
        control the transceiver to transmit the data to the determined group of object devices, control the transceiver to receive confirmation information from an object device which completes receiving of the data, among the determined group of object devices, determine a clone device based on the received confirmation information, and control the transceiver to transmit clone information to the determined clone device, wherein the transmitted clone information is used to transmit the data from the determined clone device to at least one of the plurality of object devices which is not included in the determined group of object devices among the plurality of object devices.

18. The device of claim 17, wherein the at least one processor is further configured to control the transceiver to transmit, if the host device receives the confirmation information, the data to at least one of other object devices, which are not included in the determined group of object devices among the plurality of object devices.

19. The device of claim 17, wherein the at least one processor is further configured to determine the clone device from a plurality of clone devices, and wherein other object devices not included in the determined group of object devices among the plurality of the object devices, to which the data is transmitted, are divided according to the plurality of clone devices.

20. The device of claim 17, wherein, if a size of the data is smaller than a predetermined size, the data is simultaneously transmitted to the plurality of object devices.

* * * * *